(12) United States Patent
Hsuan et al.

(10) Patent No.: US 8,433,966 B2
(45) Date of Patent: Apr. 30, 2013

(54) ACKNOWLEDGMENT CHANNEL DESIGN FOR WIRELESS ACCESS NETWORKS

(75) Inventors: Yi Hsuan, Sunnyvale, CA (US); Roshni M. Srinivasan, Santa Clara, CA (US); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 695 days.

(21) Appl. No.: 12/631,665

(22) Filed: Dec. 4, 2009

(65) Prior Publication Data

US 2011/0004796 A1    Jan. 6, 2011

Related U.S. Application Data

(60) Provisional application No. 61/223,360, filed on Jul. 6, 2009.

(51) Int. Cl.
  *G06F 11/00*    (2006.01)
(52) U.S. Cl.
  USPC ............................................. 714/748
(58) Field of Classification Search ............ 714/748
  See application file for complete search history.

(56) References Cited

U.S. PATENT DOCUMENTS

| | | | | |
|---|---|---|---|---|
| 6,724,813 | B1* | 4/2004 | Jamal et al. | 375/219 |
| 6,958,989 | B1* | 10/2005 | Dick et al. | 370/342 |
| 7,200,789 | B2* | 4/2007 | Kim et al. | 714/748 |
| 7,400,607 | B2* | 7/2008 | Kim et al. | 370/335 |
| 7,990,920 | B2* | 8/2011 | Zhang et al. | 370/329 |
| 2001/0012301 | A1* | 8/2001 | Yi et al. | 370/439 |
| 2005/0108610 | A1* | 5/2005 | Kim et al. | 714/748 |
| 2008/0267158 | A1* | 10/2008 | Zhang et al. | 370/342 |
| 2009/0073922 | A1* | 3/2009 | Malladi et al. | 370/328 |
| 2009/0129317 | A1* | 5/2009 | Che et al. | 370/328 |
| 2009/0286468 | A1* | 11/2009 | Kim et al. | 455/3.03 |
| 2011/0044223 | A1* | 2/2011 | Kim et al. | 370/312 |
| 2011/0176443 | A1* | 7/2011 | Astely et al. | 370/252 |

OTHER PUBLICATIONS

"IEEE Standard for Local and metropolitan area networks, Part 16: Air Interface for Broadband Wireless Access Systems," IEEE Computer Society and the IEEE Microwave Theory and Techniques Society, IEEE Std 802.16 2009, May 29, 2009, New York, New York.

\* cited by examiner

*Primary Examiner* — Charles Ehne
(74) *Attorney, Agent, or Firm* — Schwabe, Williamson & Wyatt, P.C.

(57) ABSTRACT

Embodiments of the present invention provide an acknowledgment channel design in which an acknowledgment sequence is scrambled with a station-specific scrambling sequence. Other embodiments may be described and claimed.

16 Claims, 8 Drawing Sheets

ACKNOWLEDGMENT CHANNEL DESIGN FOR WIRELESS ACCESS NETWORKS

CROSS REFERENCE TO RELATED APPLICATIONS

The present application claims priority to U.S. Patent Application No. 61/223,360, filed Jul. 6, 2009, entitled "Advanced Wireless Communication Systems And Techniques," the entire specification of which is hereby incorporated by reference in its entirety for all purposes, except for those sections, if any, that are inconsistent with this specification.

FIELD

Embodiments of the present disclosure relate to the field of wireless access networks, and more particularly, to an acknowledgment channel design in said wireless access networks.

BACKGROUND

In wireless access networks, a base station may transmit, to mobile station, a control information element that provides information about resource allocation and associated signaling for an uplink transmission. This information may include an allocated uplink resource size, a location of an uplink region that may be utilized by the mobile station, transmission format, an acknowledgment channel index in the downlink, etc. False detection of such a control information element may cause a mobile station to transmit uplink traffic in another mobile station's resource resulting in a traffic collision. Repeated traffic collisions may occur if the resource is a persistently allocated uplink resource. Furthermore, incorrect detection of the acknowledgment index in a network that relies on synchronous hybrid automatic repeat request (HARQ) transmissions may result in multiple retransmissions by a mobile station when it detects a negative acknowledgment intended for another mobile station.

To avoid multiple invalid transmissions due to a single false detection of an uplink control information element, a mobile station may check the downlink acknowledgment channel to determine if a base station acknowledges an initial transmission from the mobile station. However, if the mobile station incorrectly detects the acknowledgment index in the control information element, it may incorrectly detect an acknowledgment meant for another mobile station.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A and/or B" means "(A), (B), or (A and B)." For the purposes of the present invention, the phrase "A, B, and/or C" means "(A), (B), (C), (A and B), (A and C), (B and C), or (A, B and C)."

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present disclosure describe an acknowledgment channel design that may be used in wireless access networks. In particular, in accordance with some embodiments, the acknowledgment design may be used to facilitate error handling in a situation in which the unicast control information was incorrectly detected by a mobile station. Some embodiments of the disclosure describe scrambling of a transmitted acknowledgment sequence with a scrambling sequence that is specific to the mobile station to which the acknowledgment is directed. Upon reception, a descrambling of the scrambled sequence will maintain coherency only for a recipient having access to the station-specific scrambling sequence, e.g., only for the mobile station itself.

Embodiments of the present disclosure may be used in wireless access networks that employ orthogonal frequency division multiple access (OFDMA) communications as used by multicarrier transmission schemes presented in, e.g., the Institute of Electrical and Electronics Engineers (IEEE) 802.16-2009, approved May 13, 2009, along with any amendments, updates, and/or revisions (e.g., 802.16m, which is presently at predraft stage), $3^{rd}$ Generation Partnership Project (3GPP) long-term evolution (LTE) project, ultra mobile broadband (UMB) project (also referred to as "3GPP2"), etc. In other embodiments, communications may be compatible with additional/alternative communication standards and/or specifications.

Figure 1:
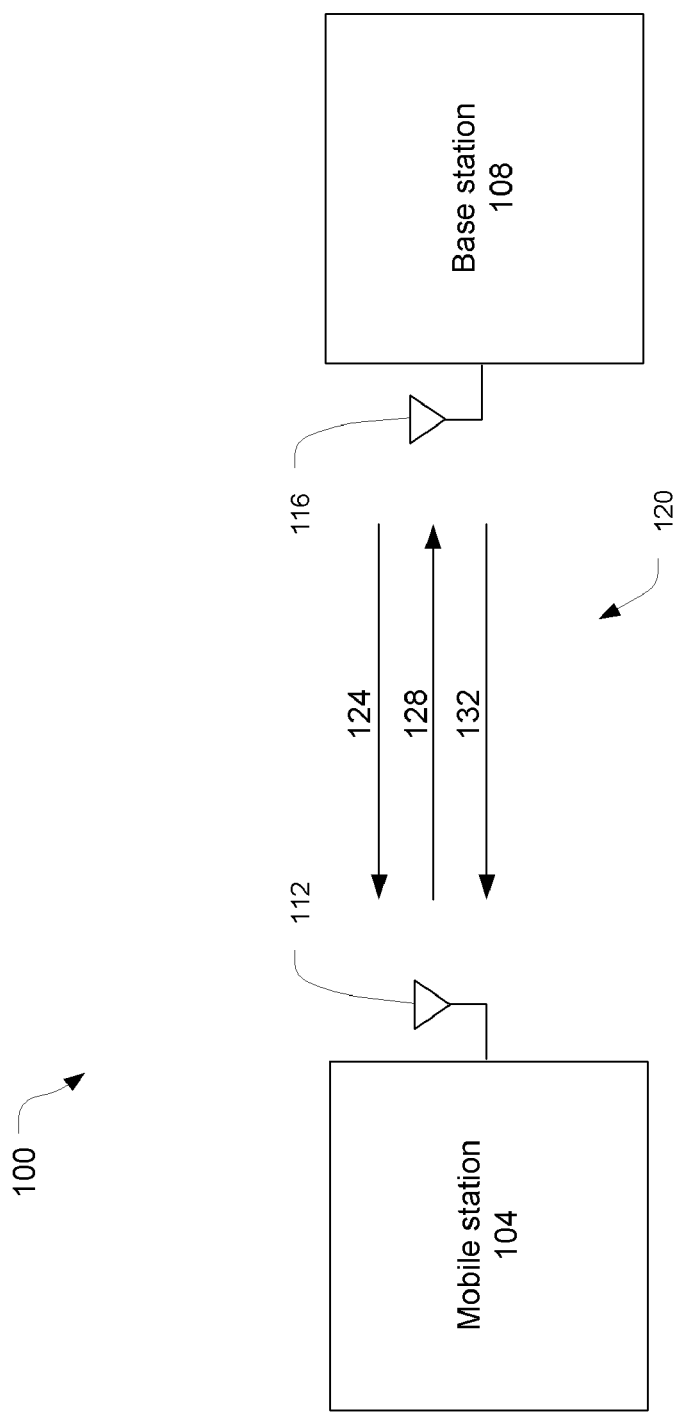
FIG. 1 illustrates a wireless communication environment in accordance with embodiments of this disclosure.

FIG. 1 illustrates a wireless communication environment 100 in accordance with an embodiment of this disclosure. In this embodiment, the wireless communication environment 100 is shown with two communication devices, e.g., mobile station 104 and base station 108, which use respective antenna structures 112 and 116 to wireless communicate with one another via an over-the-air (OTA) interface 120. Each of the antenna structures 112 and 116 may have one or more antennae. An antenna may be a directional or an omnidirectional antenna, including, e.g., a dipole antenna, a monopole antenna, a patch antenna, a loop antenna, a microstrip antenna or any other type of antenna suitable for transmission/reception of radio frequency (RF) signals.

The mobile station 104 and the base station 108 may be any type of communication devices that are capable of communicating over the OTA interface 120. In various embodiments the mobile station 104 may include a wireless electronic device such as a desktop computer, a laptop computer, a handheld computer, a tablet computer, a cellular telephone, a pager, an audio and/or video player (e.g., an MP3 player or a digital versatile disk (DVD) player), a gaming device, a video camera, a digital camera, a navigation device (e.g., a global positioning system (GPS) device), a wireless peripheral (e.g., a printer, a scanner, a headset, a keyboard, a mouse, etc.), a medical device (e.g., a heart rate monitor, a blood pressure monitor, etc.), a set-top box, and/or other suitable relatively stationary, portable, or mobile electronic devices. In various embodiments the base station 108 may include a wireless electronic device such as an access point, a base transceiver station, a radio base station, a node B, etc.

The mobile station 104 and base station 108 may use OFDM modulation to transmit large amounts of digital data by splitting a radio frequency signal into multiple small sub-signals, which in turn, are transmitted simultaneously at different frequencies. The communication devices may operate in accordance with the 802.16 family of standards, discussed above, to implement a fixed, a portable, and/or a mobile broadband wireless access (BWA) network. In other embodiments, communication between the wireless network devices may be compatible with additional/alternative specifications and/or standards.

FIG. 1 illustrates a number of communications between the depicted communication devices including a control transmission 124 from the base station 108 to the mobile station 104; a data transmission 128 from the mobile station 104 to the base station 108; and an acknowledgment transmission 132 from the base station 108 to the mobile station 104.

The control transmission 124 may have an advanced MAP (A-MAP) that includes unicast service control information. The unicast service control information may be included in one or more uplink control information elements (IEs). The unicast service control information may provide information about resource allocation and associated signaling for an uplink transmission. This information may be non user-specific, i.e., applicable to more than one user (which may or may not be designated), or user-specific, i.e., applicable to one designated user. In some embodiments, control information of a particular type may be sent in a particular A-MAP. For example, control information related to an assignment of resources (e.g., allocated uplink resource size, a location of an uplink region that may be utilized by a particular mobile station, etc.) may be transmitted in an assignment A-MAP, control information related to HARQ feedback (e.g., acknowledgment channel index to reference in the downlink) may be transmitted in a HARQ feedback A-MAP, etc. One or more A-MAPs may be transmitted in an A-MAP region, which may be located in each downlink advanced air interface (AAI) subframe.

Having received the control transmission 124, the mobile station 104 may utilize the unicast service control information, even if incorrectly received, for subsequent communications with the base station 108 including, e.g., the data transmission 128. The data transmission 128 may include one or more individual transmissions.

Upon receiving some or all of the data transmission 128, the base station 108 may generate an acknowledgment message to indicate to the mobile station 104 whether the data transmission 128 was successfully received by the base station 108. If the data transmission 128 was successfully received, the acknowledgment message may include a positive acknowledgment, which may be referred to as ACK. If the data transmission 128 was not successfully received, the acknowledgment message may include a negative acknowledgment, which may be referred to as NACK. The acknowledgments of the acknowledgment message may be provided as ACK/NACK information elements (IEs) located in a HARQ feedback A-MAP. The mobile station 104 may access a particular part of the HARQ feedback A-MAP, based on the acknowledgment index it received in the unicast service control information, to retrieve the relevant ACK/NACK IE(s).

As will be described in further detail below, the acknowledgment message may be scrambled with a scrambling sequence specific to the mobile station 104. If, upon descrambling, the received acknowledgment message is coherent, the mobile station 104 may determine that it is the intended recipient of the acknowledgment message. Else, it may determine that it is not the intended recipient and may disregard the acknowledgment.

In some embodiments, if the mobile station 104 determines that it is not the intended recipient of an acknowledgment message, the mobile station 104 may determine that there was an error in the reception of the unicast service control information (e.g., it received an incorrect acknowledgment index). In some embodiments, the mobile station 104 may then initiate a process in which the unicast service control information is resent to the mobile station 104 from the base station 108. In some embodiments the mobile station 104 may, upon determining there was an error in reception of unicast service control information, additionally/alternatively refrain from further reliance on some or all of the unicast service control information.

Figure 2:
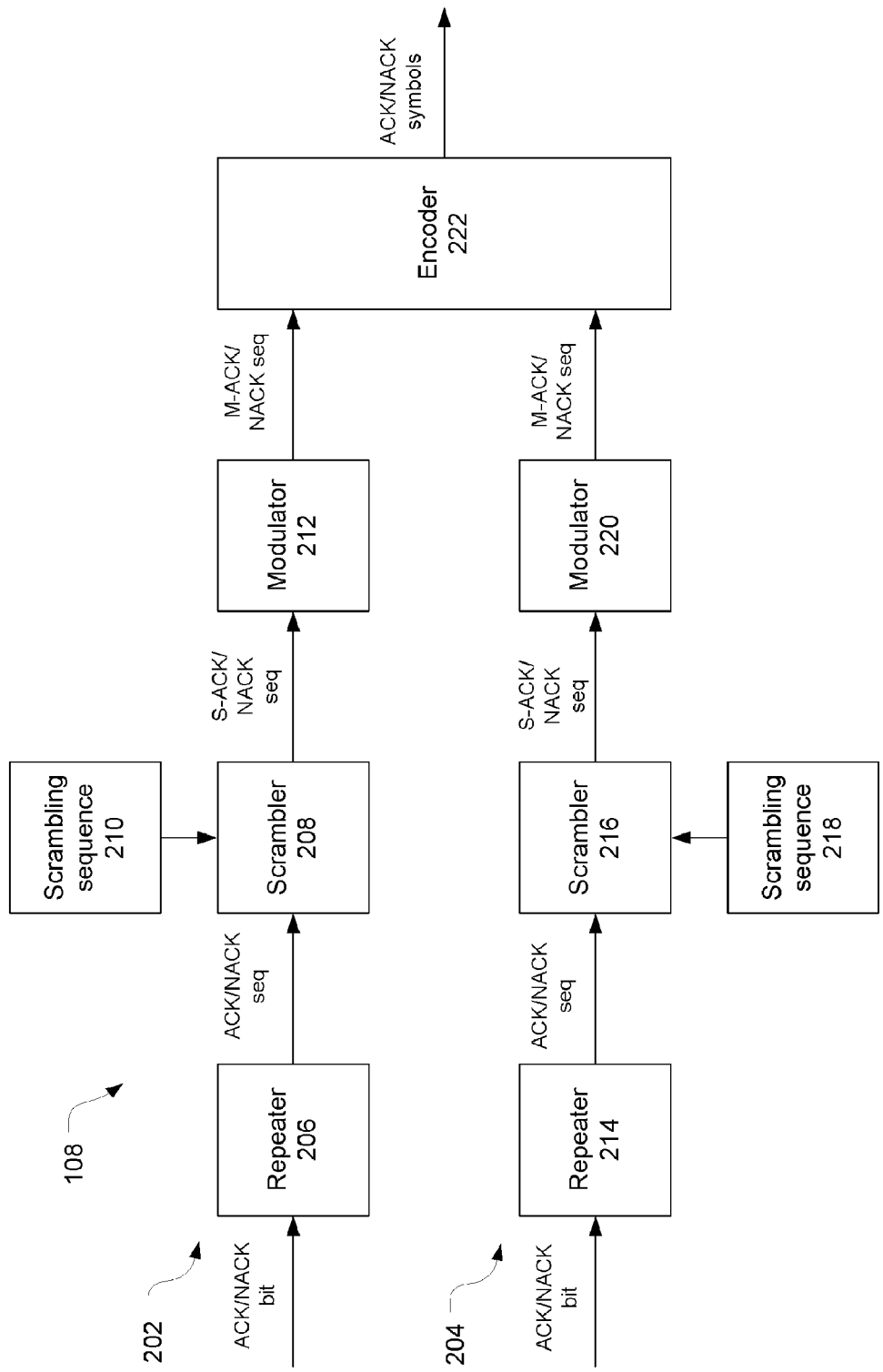
FIG. 2 illustrates components of a base station in accordance with some embodiments.

FIG. 2 illustrates components of the base station 108 in accordance with some embodiments. The base station 108 in this embodiment may include two, similar channels, e.g., channels 202 and 204. Referring first to channel 202, an acknowledgment bit may be received by a repeater 206. The acknowledgment bit, or ACK/NACK IE, may be an ACK bit or a NACK bit dependent on whether a preceding data transmission was successfully received. The repeater 206 may repeat the ACK/NACK bit a given number of times, e.g., eight times, to generate an ACK/NACK sequence. For example, if the ACK/NACK bit was a binary one, which may represent a positive acknowledgment, the ACK/NACK sequence generated by the repeater 206 may be a sequence of eight binary ones. The ACK/NACK sequence may then be provided to a scrambler 208. The scrambler 208 may reference a scrambling sequence 210 that is specific to a mobile station to which the ACK/NACK bit will be sent, e.g., the mobile station 104. The scrambler 208 may then scramble the ACK/NACK sequence based on the scrambling sequence 210 to provide a scrambled ACK/NACK (S-ACK/NACK) sequence.

Figure 3:
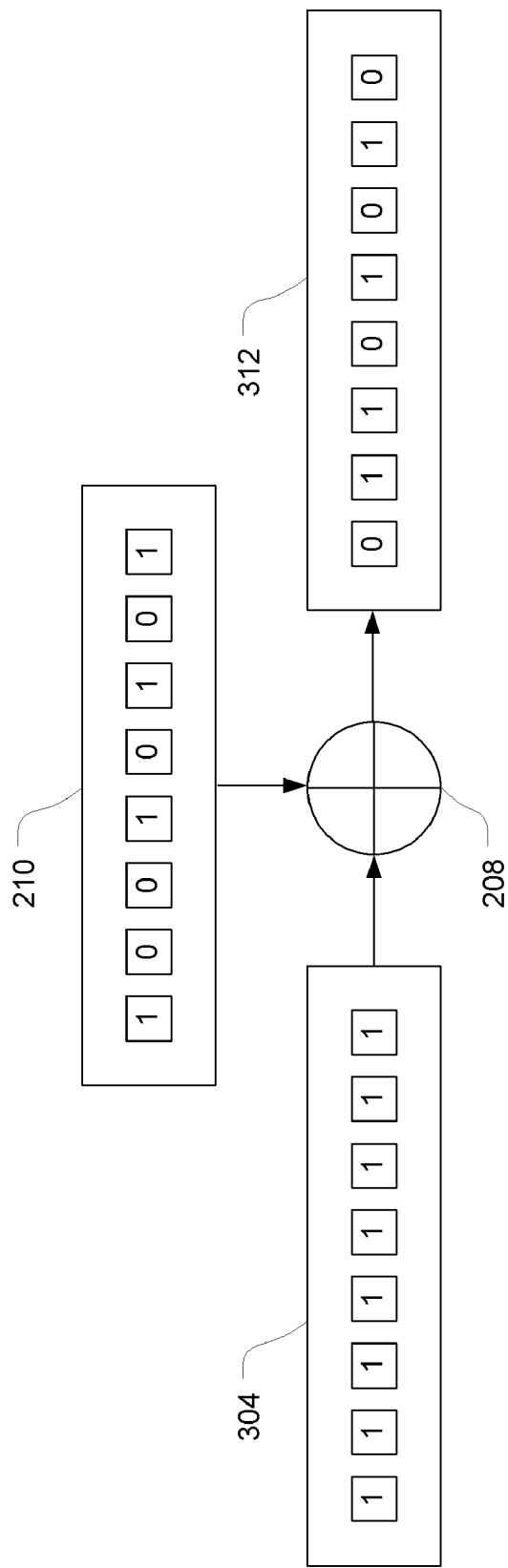
FIG. 3 illustrates a scrambling operation in accordance with some embodiments.

FIG. 3 illustrates a scrambling operation in accordance with some embodiments. An ACK/NACK sequence 304 may be provided to the scrambler 208, which may be a binary adder in this embodiment. The scrambler 208 may then add the ACK/NACK sequence 304 to the scrambling sequence 210 of an equal size to produce the S-ACK/NACK sequence 312. To facilitate the scrambling operation in this embodiment, it may be desirable for the scrambling sequence 210 to be the same length as the ACK/NACK sequence 304.

In some embodiments, a scrambling sequence may be based on a station identifier (STID) of the mobile station to which the acknowledgment message is directed. If the related STID is longer than the ACK/NACK sequence, the scrambling sequence may be a portion of the STID, e.g., the most significant bits of the STID, the least significant bits of the STID, or some other portion.

Referring again to FIG. 2, the S-ACK/NACK sequence may be provided to a modulator 212. The modulator 212 may be a phase shift key (PSK) modulator that is configured as, e.g., a binary phase shift key (BPSK) modulator or a quadrature phase shift keying (QPSK) modulator. In general, the modulator 212 may modulate the S-ACK/NACK sequence by mapping each bit to a point in a signal constellation, which may correspond to a particular modulation process of a carrier signal, to produce a modulated ACK/NACK (M-ACK/NACK) sequence. BPSK may be capable of mapping one bit to a point in a signal constellation while QPSK may be capable of mapping two bits to a point in a signal constellation.

The channel 204 may include a repeater 214, a scrambler 216, a scrambling sequence 218, and a modulator 220 that operate in a manner similar to like-named components of channel 202.

The base station 108 may include an encoder 222 such as a space-frequency block coding (SFBC) encoder that is configured to receive the M-ACK/NACK sequences from the channels 202 and 204 and encode the sequences into ACK/NACK symbols that may be transmitted over the OTA interface 120 by the antenna structure 116. The encoder 222 may be a multiple-input/multiple output (MIMO) encoder in some embodiments.

Figure 4:
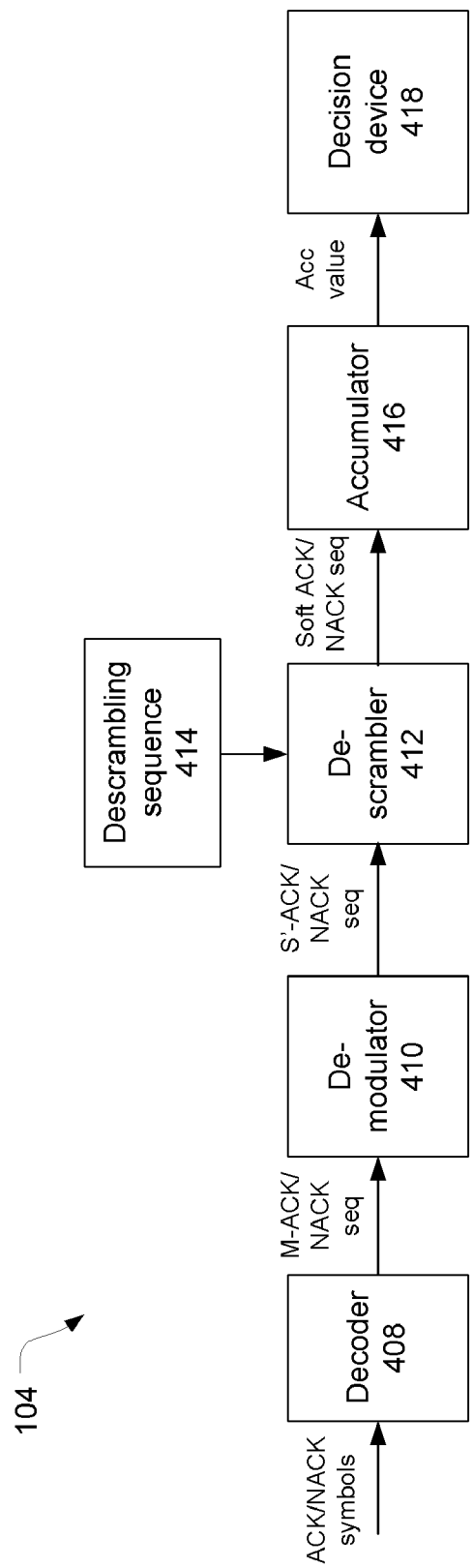
FIG. 4 illustrates components of a mobile station in accordance with some embodiments.

FIG. 4 illustrates components of the mobile station 104 in accordance with some embodiments. The mobile station 104 may include a decoder 408 such as an SFBC decoder that is coupled with the antenna structure 112 to receive ACK/NACK symbols. Upon receiving the ACK/NACK symbols from the antenna structure 112, the decoder 408 may produce the M-ACK/NACK sequence by performing decoding operations that complement the encoding operations of encoder 222. The decoder 408 may be a MIMO decoder in some embodiments.

The mobile station 104 may also include a demodulator 410 such as a PSK demodulator that is coupled with the decoder 408 to receive the M-ACK/NACK sequence. Upon receiving the M-ACK/NACK sequence from the decoder 408, the demodulator 410 may map the various points on the received signal constellation to various soft values to produce an S'-ACK/NACK sequence. The soft values of the S'-ACK/NACK sequence may correspond to characteristics of the modulated signal received by the mobile station 104. For example, with respect to BPSK modulation, the S'-ACK/NACK sequence may be a series of negative ones, which correspond to frequency shifts in a negative direction that are used to represent a binary zero of the S-ACK/NACK sequence, and positive ones, which correspond to frequency shifts in a positive direction that are used to represent a binary one of the S-ACK/NACK sequence. For example, an S'-ACK/NACK sequence that corresponds to the S-ACK/NACK sequence 312, may be −1, 1, 1, −1, 1, −1, 1, −1.

Figure 5:
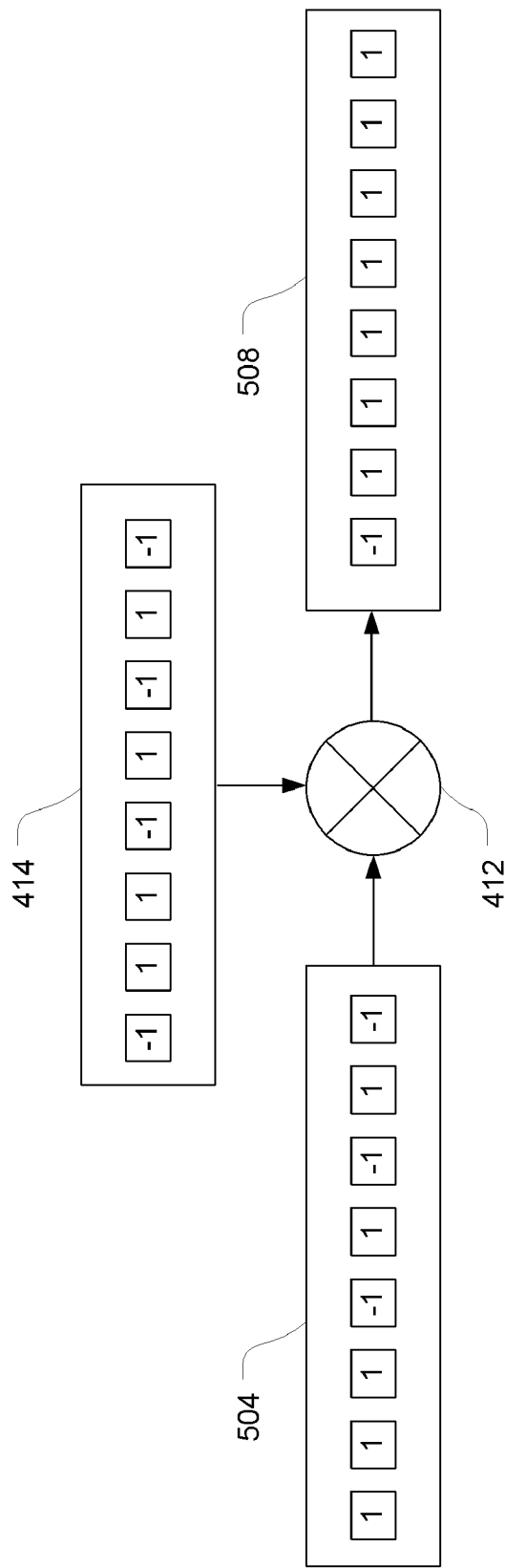
FIG. 5 illustrates a descrambling operation in accordance with some embodiments.

The mobile station 104 may also include a descrambler 412 that is coupled with the demodulator 410 to receive the S'-ACK/NACK sequence and perform a descrambling operation as shown in FIG. 5 in accordance with some embodiments. Upon receiving an S'-ACK/NACK sequence 504 from the demodulator 410, the descrambler 412, which may be a multiplier in this embodiment, may produce a soft ACK/NACK sequence 508 based on a descrambling sequence 414 that is associated with the mobile station 104. As shown in FIG. 5, only the first value of the S'-ACK/NACK sequence 504 was received incorrectly, i.e., it was received as positive one rather than negative one.

The descrambling sequence 414 may be based on some or all of the STID of the mobile station 104 and may complement the scrambling sequence 210/218. In some embodiments the descrambling sequence 414 may be generated by converting the binary ones of the scrambling sequence 210 to a negative one, and converting the binary zeros of the scrambling sequence 210 to a positive one.

Referring again to FIG. 4, the mobile station 104 may also include an accumulator 416 coupled with the descrambler 412 to receive the soft ACK/NACK sequence, e.g. soft ACK/NACK sequence 508. The accumulator 416 may accumulate the values of the soft ACK/NACK sequence to produce an accumulated value (Acc value). This may be done by adding together the values of the soft ACK/NACK sequence.

The mobile station 104 may include a decision device 418 coupled with the accumulator 416 to receive the accumulated value. Upon receiving the accumulated value from the accumulator 416, the decision device 418 may determine a coherency of the ACK/NACK sequence and the value of the ACK/NACK bit. In some embodiments, if the accumulated value is within a predetermined range of incoherent values, the ACK/NACK sequence may be determined to be incoherent. For example, if the accumulated value is between minus three and positive three it may be determined that the scrambling sequence at the mobile station 104 did not match the scrambling sequence used by the base station 108 and, therefore, the acknowledgment message was not directed to the mobile station 104. If the accumulated value is outside of the incoherent range, e.g., either above or below the incoherent range, the decision device 418 may determine the acknowledgment message was directed to the mobile station 104. In some embodiments, if the accumulated value is outside of the incoherent range in a first direction, e.g., above the incoherent range (e.g., is a value of positive four to positive eight), the decision device 418 may determine that the soft ACK/NACK sequence is a coherent sequence that provides a positive acknowledgment. Conversely, if the accumulated value is outside of the incoherent range in a second direction, e.g., below the incoherent range (e.g., is a value of negative four to negative eight) the decision device 418 may determine that the soft ACK/NACK sequence is a coherent sequence that provides a negative acknowledgment.

In the embodiment shown in FIG. 5, the accumulated value corresponding to the soft ACK/NACK sequence 508 may be positive seven, which may be considered a coherent value that indicates an ACK.

Figure 6:
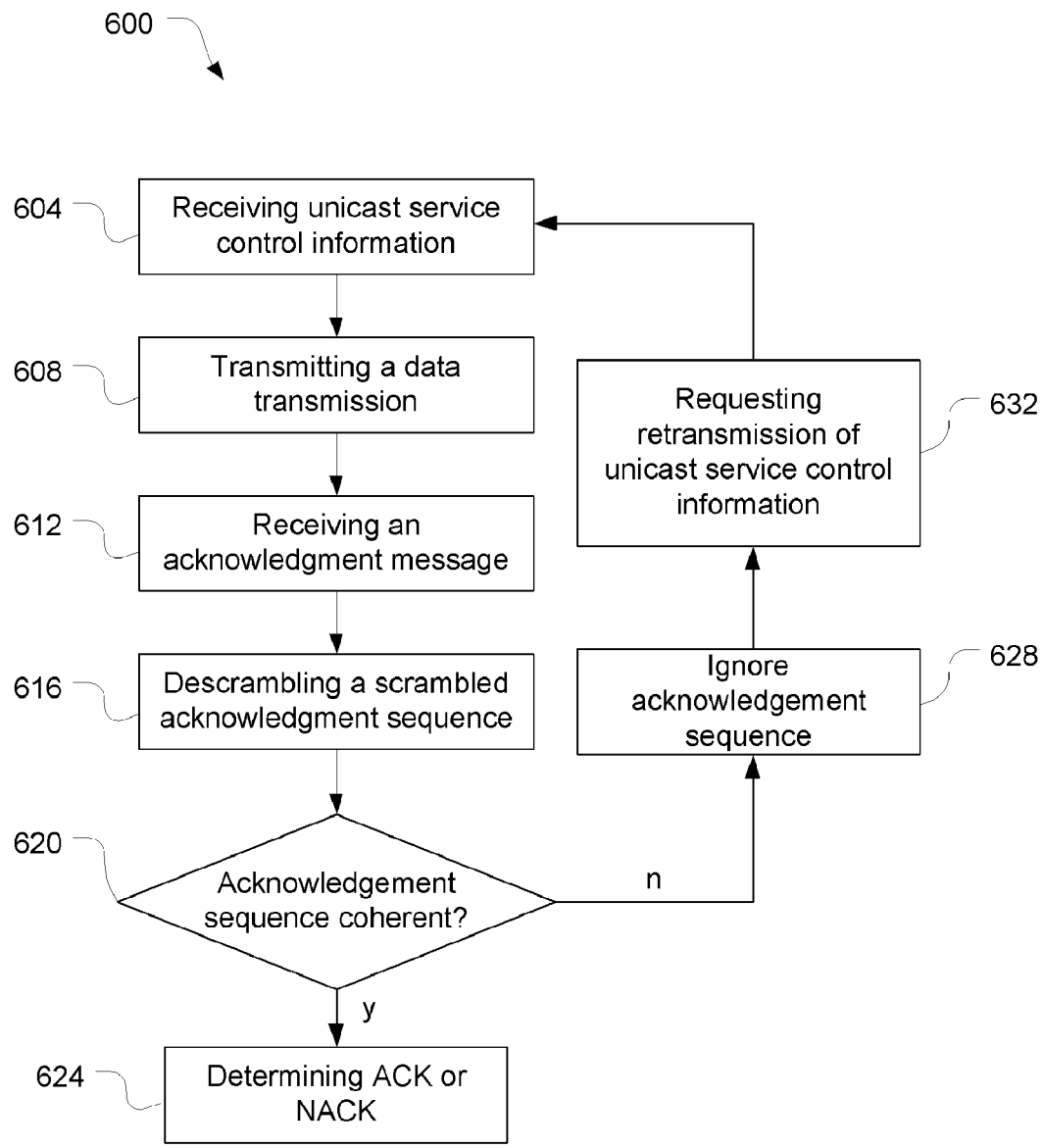
FIG. 6 is a flowchart illustrating operations of a mobile station in accordance with some embodiments.

FIG. 6 is a flowchart 600 illustrating operations of the mobile station 104 in accordance with some embodiments. At block 604 ("Receiving unicast service control information"), the mobile station 104 may receive A-MAP(s) that have control information including, inter alia, HARQ feedback information such as an acknowledgment index.

At block 608 ("Transmitting a data transmission"), the mobile station 104 may transmit a data transmission to the base station 108. The data transmission may be in accordance with uplink control information that was previously communicated to the mobile station 104 in the A-MAPs received from the base station 108.

At block 612 ("Receiving an acknowledgment message"), the mobile station 104 may receive an acknowledgment message in the ACK/NACK channel having the acknowledgment index that the mobile station 104 determined was in the unicast service control information. The acknowledgment message may convey a scrambled acknowledgment sequence, e.g., S'-ACK/NACK sequence.

At block 616 ("Descrambling a scrambled acknowledgment sequence"), the mobile station 104 may descramble the scrambled acknowledgment sequence conveyed by the acknowledgment message to produce a descrambled acknowledgment sequence (or simply, "an acknowledgment sequence"), e.g., soft ACK/NACK sequence. As discussed above, the mobile station 104, and the descrambler 412, in particular, will use a descrambling sequence that is specific to the mobile station 104. This may be based on a STID associated with the mobile station 104, or a portion thereof.

At block 620 ("Acknowledgment sequence coherent?"), the mobile station 104 may determine whether the acknowledgment sequence is coherent. The coherency determination may be made on the basis of an accumulated value that is related to the acknowledgment sequence. In some embodiments, the accumulated value may simply be a sum of the values of a soft sequence. In other embodiments, other parameters may be accumulated and used as the accumulated value. In some embodiments, the mobile station 104, and the decision device 418, in particular, may determine whether the acknowledgment sequence is coherent based on whether the accumulated value falls within a predetermined range of incoherent values. If so, the acknowledgment sequence may be deemed incoherent; else, the acknowledgment sequence may be deemed coherent. A determination of coherency at block 620 may confirm that, at least a portion of, the unicast service control information was successfully received by the mobile station 104 at block 604.

In some embodiments, only a subset of the acknowledgment transmissions (e.g., only the first acknowledgment transmission) sent to a particular mobile station may be scrambled with the station specific scrambling sequence. This may be sufficient for a mobile station to confirm that the unicast service control information, or at least the acknowledgment index, was properly received.

If the acknowledgment sequence is deemed coherent at block 620, then the process may advance to block 624 ("Determining ACK or NACK") where the mobile station 104 may determine whether the acknowledgment sequence conveys a positive acknowledgment or a negative acknowledgment of the base station 108 successfully receiving the data transmission transmitted at block 608.

If the acknowledgment sequence is deemed incoherent at block 620, then the process may advance to block 628 ("Ignore acknowledgment sequence") where the mobile station 104 may assume that it was not the intended recipient of the acknowledgment message and, therefore, ignore the acknowledgment sequence. The mobile station 104 may also refrain from further data transmissions based on the previous unicast control information received in, e.g., the control transmission 124.

In some embodiments, at block 632 ("Requesting retransmission of unicast service control information") the mobile station 104 may determine that the unicast service control information was not received correctly at block 504 and, therefore, request that the base station 108 retransmit the appropriate A-MAP(s). The process may then advance to block 604. In other embodiments, instead of actively requesting a retransmission of unicast service control information, the mobile station 104 may simply wait for a periodic update of unicast service control information.

Figure 7:
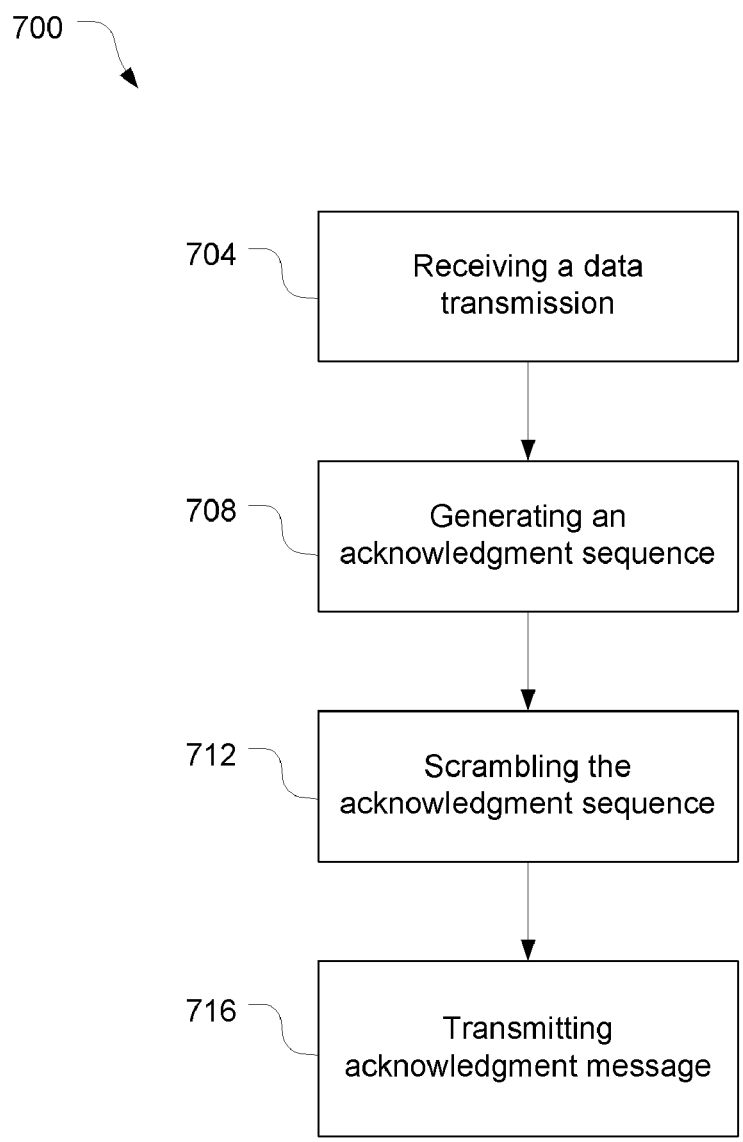
FIG. 7 is a flowchart illustrating operations of a base station in accordance with some embodiments.

FIG. 7 is a flowchart 700 illustrating operations of the base station 108 in accordance with some embodiments. At block 704 ("Receiving a data transmission"), the base station 108 may receive a data transmission from the mobile station 104. The data transmission may be received either successfully or unsuccessfully.

At block 708 ("Generating an acknowledgment sequence"), the base station 108 may generate an acknowledgment sequence that is indicative of whether the data transmission received at block 704 was successful or not. In some embodiments, the generation of the acknowledgment sequence may involve the generation of an acknowledgment bit, and a repetition of the acknowledgment bit a predetermined number of times, e.g., n times. In some embodiments, n may be equal to eight.

At block 712 ("Scrambling the acknowledgment sequence"), the base station 108 may access a scrambling sequence that is specific to the mobile station 104 and use the scrambling sequence to scramble the acknowledgment sequence, thereby producing a scrambled acknowledgment sequence, e.g., S-ACK/NACK sequence. A scrambling sequence is considered specific to the mobile station 104 if it is unique among all of the mobile stations currently being served by the base station 108. The scrambling sequence may be the same length as the acknowledgment sequence, e.g., n bits. In some embodiments, when the scrambling sequence is based on the STID associated with the mobile station 104 and the STID is longer than n bits, an n-bit portion of STID may be used as the scrambling sequence. This n-bit portion may be the n least significant bits, the n most significant bits, or some other portion.

At block 716 ("Transmitting acknowledgment message"), the base station 108 may generate and transmit an acknowledgment message, e.g., ACK/NACK symbols, that conveys the scrambled acknowledgment sequence. In some embodiments, the acknowledgment message may include a HARQ feedback map.

Figure 8:
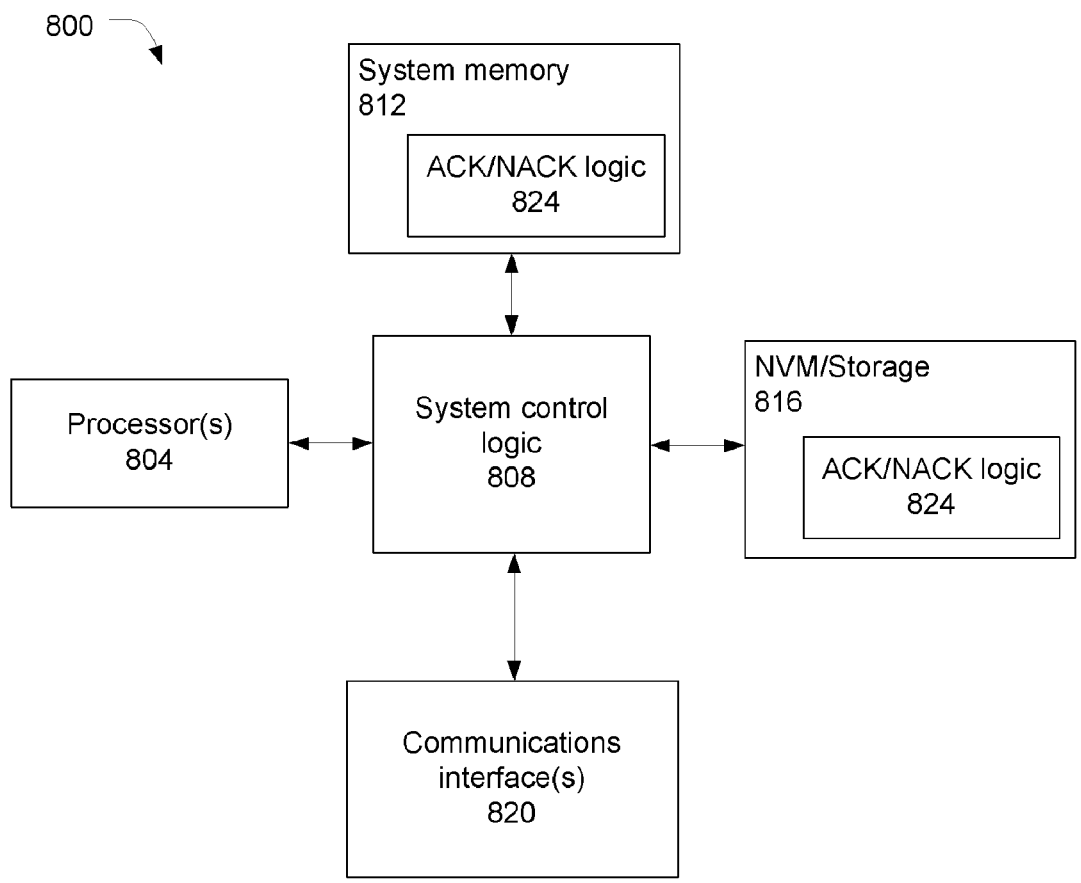
FIG. 8 illustrates an example system computing device capable of implementing a communication device in accordance with some embodiments.

The communication devices described herein may be implemented into a system using any suitable hardware and/or software to configure as desired. FIG. 8 illustrates, for one embodiment, an example system 800 comprising one or more processor(s) 804, system control logic 808 coupled to at least one of the processor(s) 804, system memory 812 coupled to system control logic 808, non-volatile memory (NVM)/storage 816 coupled to system control logic 808, and one or more communications interface(s) 820 coupled to system control logic 808.

System control logic 808 for one embodiment may include any suitable interface controllers to provide for any suitable interface to at least one of the processor(s) 804 and/or to any suitable device or component in communication with system control logic 808.

System control logic 808 for one embodiment may include one or more memory controller(s) to provide an interface to system memory 812. System memory 812 may be used to load and store data and/or instructions, for example, for system 800. System memory 812 for one embodiment may include any suitable volatile memory, such as suitable dynamic random access memory (DRAM), for example.

System control logic 808 for one embodiment may include one or more input/output (I/O) controller(s) to provide an interface to NVM/storage 816 and communications interface (s) 820.

NVM/storage 816 may be used to store data and/or instructions, for example. NVM/storage 816 may include any suitable non-volatile memory, such as flash memory, for example, and/or may include any suitable non-volatile storage device(s), such as one or more hard disk drive(s) (HDD (s)), one or more compact disc (CD) drive(s), and/or one or more digital versatile disc (DVD) drive(s) for example.

The NVM/storage 816 may include a storage resource physically part of a device on which the system 800 is installed or it may be accessible by, but not necessarily a part of, the device. For example, the NVM/storage 816 may be accessed over a network via the communications interface(s) 820.

System memory 812 and NVM/storage 816 may include, in particular, temporal and persistent copies of ACK/NACK logic 824, respectively. The ACK/NACK logic 824 may include instructions that when executed by at least one of the processor(s) 804 result in the system 800 performing acknowledgment operations as described in conjunction with the either the mobile station 104 or the base station 108 described herein. The acknowledgment operations may include, but are not limited to, scrambling operations, descrambling operations, coherency determination operations, etc. In some embodiments, the ACK/NACK logic 824 may additionally/alternatively be located in the system control logic 808.

Communications interface(s) 820 may provide an interface for system 800 to communicate over one or more network(s) and/or with any other suitable device. Communications interface(s) 820 may include any suitable hardware and/or firmware. Communications interface(s) 820 for one embodiment may include, for example, a network adapter, a wireless network adapter, a telephone modem, and/or a wireless modem. For wireless communications, communications interface(s) 820 for one embodiment may use one or more antenna(s).

For one embodiment, at least one of the processor(s) 804 may be packaged together with logic for one or more controller(s) of system control logic 808. For one embodiment, at least one of the processor(s) 804 may be packaged together with logic for one or more controllers of system control logic 808 to form a System in Package (SiP). For one embodiment, at least one of the processor(s) 804 may be integrated on the same die with logic for one or more controller(s) of system control logic 808. For one embodiment, at least one of the processor(s) 804 may be integrated on the same die with logic for one or more controller(s) of system control logic 808 to form a System on Chip (SoC).

In various embodiments, system 800 may have more or less components, and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
    receiving, at a base station, a data transmission from a mobile station;
    determining an acknowledgment bit that is indicative of a successful or unsuccessful receipt of the data transmission;
    generating an acknowledgment sequence by repeating the acknowledgment bit n times, wherein n is an integer;
    scrambling the acknowledgment sequence with a scrambling sequence specific to the mobile station to produce a scrambled sequence; and
    transmitting an acknowledgment message to the mobile station to convey the scrambled sequence.

2. The method of claim 1, further comprising:
    scrambling the acknowledgment sequence by adding the scrambling sequence to the acknowledgment sequence.

3. The method of claim 2, wherein the scrambling sequence is n bits of a station identifier associated with the mobile station.

4. The method of claim 3, wherein the station identifier includes m bits, wherein m is an integer greater than n, and the n bits are n least significant bits of the station identifier.

5. The method of claim 1, wherein said transmitting comprises:
    transmitting a hybrid automatic repeat request (HARQ) feedback map to the mobile station.

6. A method comprising:
    transmitting, by a mobile station, an uplink transmission to a base station;
    receiving, by the mobile station, an acknowledgment message;
    descrambling the acknowledgment message using a descrambling sequence uniquely associated with the mobile station to generate an acknowledgment sequence; and
    determining a coherency of the acknowledgment sequence.

7. The method of claim 6, wherein said determining the coherency comprises:
    producing an accumulated value based on the acknowledgment sequence; and
    determining that the acknowledgment sequence is not coherent if the accumulated value is within a predetermined range of incoherent values.

8. The method of claim 7, wherein said determining the coherency comprises:
    determining that the accumulated value is outside of the predetermined range of incoherent values; and
    determining that the acknowledgment sequence is coherent based on said determining that the accumulated value is outside of the predetermined range.

9. The method of claim 8, further comprising:
    determining that the acknowledgment sequence indicates a positive acknowledgment if the accumulated value is outside of the predetermined range in a first direction; and
    determining that the acknowledgment sequence indicates a negative acknowledgment if the accumulated value is outside the predetermined range in a second direction.

10. The method of claim 6, wherein said determining the coherency of the acknowledgment sequence comprises determining the acknowledgment sequence is incoherent, and the method further comprises:
    requesting a retransmission of unicast service control information from the base station based on said determining the acknowledgment sequence is incoherent.

11. The method of claim 6, further comprising:
    receiving unicast service control information from the base station; and
    validating the unicast service control information based on said determining of the coherency of the acknowledgment sequence.

12. An apparatus comprising:
    one or more components configured to receive an acknowledgment message via an over-the-air interface and to produce a scrambled acknowledgment sequence based on the acknowledgment message;

a descrambler coupled with the one or more components and configured to receive the scrambled acknowledgment sequence and to produce an acknowledgment sequence based on a descrambling sequence that is specific to the apparatus; and a decision device coupled with the descrambler and configured to determine whether the apparatus is an intended recipient of the acknowledgment message based on the acknowledgment sequence.

13. The apparatus of claim 12, further comprising:

an accumulator coupled with the descrambler and the decision device and configured to produce an accumulated value based on the acknowledgment sequence; and the decision device further configured to determine that the apparatus is the intended recipient if the accumulated value is outside of a predetermined range of values.

14. The apparatus of claim 13, wherein the decision device is further configured to determine that the acknowledgment sequence indicates a positive acknowledgment if the accumulated value is outside of the predetermined range in a first direction; and determine that the acknowledgment sequence indicates a negative acknowledgment if the accumulated value is outside of the predetermined range in a second direction.

15. The apparatus of claim 12, wherein the descrambling sequence is based on a portion of an identifier associated with the apparatus.

16. The apparatus of claim 12, wherein the decision device is configured to determine that the apparatus is not the intended recipient of the acknowledgment message and the apparatus further comprises:

a transceiver configured to transmit a request to a base station to retransmit unicast service control information based on the determination that the apparatus is not the intended recipient.

* * * * *